US012694028B2

(12) United States Patent
Gentric et al.

(10) Patent No.: US 12,694,028 B2
(45) Date of Patent: Jul. 28, 2026

(54) SEARCH REQUEST PROCESSING

(71) Applicant: AMADEUS S.A.S., Biot (FR)

(72) Inventors: Philippe Gentric, La Colle-sur-Loup (FR); Yannick Devaux, Mougins (FR); Youri Le Toquin, Nice (FR); Rosa Candela, Antibes (FR); Julien Bianchi, Nice (FR); Sebastien Autran, Nice (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 19/076,801

(22) Filed: Mar. 11, 2025

(65) Prior Publication Data

US 2025/0291799 A1     Sep. 18, 2025

(30) Foreign Application Priority Data

Mar. 15, 2024     (EP) ..................................... 24315095

(51) Int. Cl.
| | |
|---|---|
| *G06F 16/00* | (2019.01) |
| *G06F 16/21* | (2019.01) |
| *G06F 16/2455* | (2019.01) |
| *G06F 16/2458* | (2019.01) |
| *G06F 16/248* | (2019.01) |

(52) U.S. Cl.
CPC ...... *G06F 16/24552* (2019.01); *G06F 16/219* (2019.01); *G06F 16/2458* (2019.01); *G06F 16/248* (2019.01)

(58) Field of Classification Search
CPC ............. G06F 16/24552; G06F 16/248; G06F 16/219; G06F 16/2458
USPC ........................................................ 707/722
See application file for complete search history.

(56) References Cited

U.S. PATENT DOCUMENTS

| | | | |
|---|---|---|---|
| 2020/0159860 A1 | 5/2020 | Du et al. | |
| 2020/0364243 A1* | 11/2020 | Tamayo-Rios ...... | G06F 16/2458 |
| 2022/0179910 A1 | 6/2022 | Bharathy et al. | |
| 2023/0185796 A1* | 6/2023 | Subramanian ........ | G06F 16/219 |
| | | | 705/2 |
| 2023/0196199 A1 | 6/2023 | Stefani | |

* cited by examiner

*Primary Examiner* — Chelcie L Daye
(74) *Attorney, Agent, or Firm* — Perry + Currier Inc.

(57) ABSTRACT

Method, systems and computer programs for handling search requests at a search platform are provided. The search platform determines, using a cache with a number of incomplete search results, one or more of the incomplete search results with first data fields that correspond to the least one search parameter. For each determined incomplete search result, the search platform generates at least one second data field using a machine learning model. The at least one second data field corresponds to at least one search parameter and the at least one first data field of each determined incomplete search result. The search platform assembles a number of completed search results on the basis of the determined incomplete search results and the generated at least one second data field and returns at least one of the completed search results.

12 Claims, 9 Drawing Sheets

| ID | Parameter 1 | Parameter 2 | Parameter 3 | Parameter 4 | Parameter 5 |
|---|---|---|---|---|---|
| 1 | AAA | BBB | 563 | | |
| 2 | SUP | GHI | 815 | | |
| 3 | POI | ZTR | 514 | | |
| 4 | DEF | BBB | 667 | | |
| 5 | EIN | MLP | 811 | | |
| 6 | CET | DAX | 913 | | |

First data fields

Second data fields

FIG. 4

| ID | Parameter 1 | Parameter 2 | Parameter 3 | Parameter 4 | Parameter 5 |
|----|-------------|-------------|-------------|-------------|-------------|
| 1  | AAA         | BBB         | 563         | RUT         | 980         |
| 2  | SUP         | GHI         | 815         |             |             |
| 3  | POI         | ZTR         | 514         |             |             |
| 4  | DEF         | BVC         | 667         | WIS         | 850         |
| 5  | EIN         | MLP         | 811         |             |             |
| 6  | CET         | DAX         | 913         |             |             |

FIG. 6

SEARCH REQUEST PROCESSING

CROSS-REFERENCE TO RELATED APPLICATION

This application claims priority from European Application No. 24315095.0, filed Mar. 15, 2024, which is also incorporated herein by reference in its entirety.

FIELD

The present disclosure relates to an information technology method and a system. More specifically, it relates to database search and computation technology providing search results in response to search requests.

BACKGROUND

Search requests from clients to search system typically include one or more search parameters and corresponding values which indicate requested search results. A platform processes a search request, identifies one or more search results being in accordance with the search parameter values and returns the search results to the client.

Multiple sources for search response data determination may be present, wherein these multiple sources may incorporate different characteristics in terms of response times, processing resources, data validity and freshness, etc. Thus, degrees of freedom exist for the search system how to utilize such sources in order to prepare search response data.

Attention is drawn to improving the operating mechanisms underlying the processing of search requests with respect to efficient handling of subsequent search requests.

SUMMARY

The present disclosure seeks to provide improvements of the existing search methodologies, in particular in the area of search request processing and determination of search response data to be returned in response to a search request. The present mechanisms are set forth by the independent claims.

According to a first aspect, a method for processing search requests at a search platform is provided. The search platform is arranged to access a cache with a number of incomplete search results. Each incomplete search result comprises at least one first data field. In response to receiving a search request with at least one search parameter from a client, the search platform determines, using the cache, one or more of the incomplete search results with first data fields that correspond to the at least one search parameter. For each determined incomplete search result, the search platform generates at least one second data field using a machine learning model, wherein the at least one second data field corresponds to the at least one search parameter and the at least one first data field of each determined incomplete search result. The search platform assembles a number of completed search results on the basis of the determined incomplete search results and the generated at least one second data field and returns at least one of the completed search results to the client.

In some embodiments, the search request indicates at least two search parameters, wherein at least one first search parameter relates to at least one first data field and at least one second search parameter relates to the at least second data field. The search platform determines the one or more of the incomplete search results with first data fields that correspond to the at least one first data parameter. For each determined incomplete search result, the search platform generates the at least one second data field using the machine learning model, wherein the at least one second data field corresponds to the at least one second search parameter and the at least one first data field of each determined incomplete search result.

In some embodiments, the machine learning model comprises at least one of deep neural network, a gradient boosting tree model, and a generative artificial intelligence model.

In some embodiments, the search platform generates at least one second data field by traversing a hierarchical tree with multiple branches, utilizing the machine learning model to predict a subset of the branches of the hierarchical tree for traversing, and skipping traversing the hierarchical tree when the predicted subset of the branches has been traversed.

In some embodiments, the search platform skips traversing the hierarchical tree prior to completing traversing the predicted subset of the branches in response to a further side-condition being fulfilled.

In some embodiments, the search platform receives, from the client, a previous search request preceding the search request. The search platform generates, using at least an original data source, one or more complete previous search results including at least one first data field and at least one second data field corresponding to one or more search parameters in the previous search request, and returns at least one of the generated one or more complete previous search results to the client. The search request from the client requests an update of at least one of the returned complete previous one or more search results, the update requiring an update of at least one second data field and wherein generating at least one second data field using the machine learning model constitutes the update of the at least one second data field.

According to a second aspect, a computing system is provided comprising the computing platform, wherein the computing system is arranged to perform the aforementioned method aspect and embodiments.

Finally, a computer program is presented that comprises instructions which, when the program is executed by a computer, cause the computer to carry out the aforementioned method aspect and embodiments when executed by the computer.

Further refinements are set forth by the description.

These and other objects, embodiments and advantages will become readily apparent to those skilled in the art from the following detailed description of the embodiments having reference to the attached figures, the invention not being limited to any particular embodiments.

BRIEF DESCRIPTION OF THE FIGURES

Aspects and examples of the present disclosure are described with reference to the following figures, in which:

FIG. 4 shows a generic example of first data fields and second data fields still to be generated.

3

FIG. 6 illustrates generated second data fields.

Figure 7:
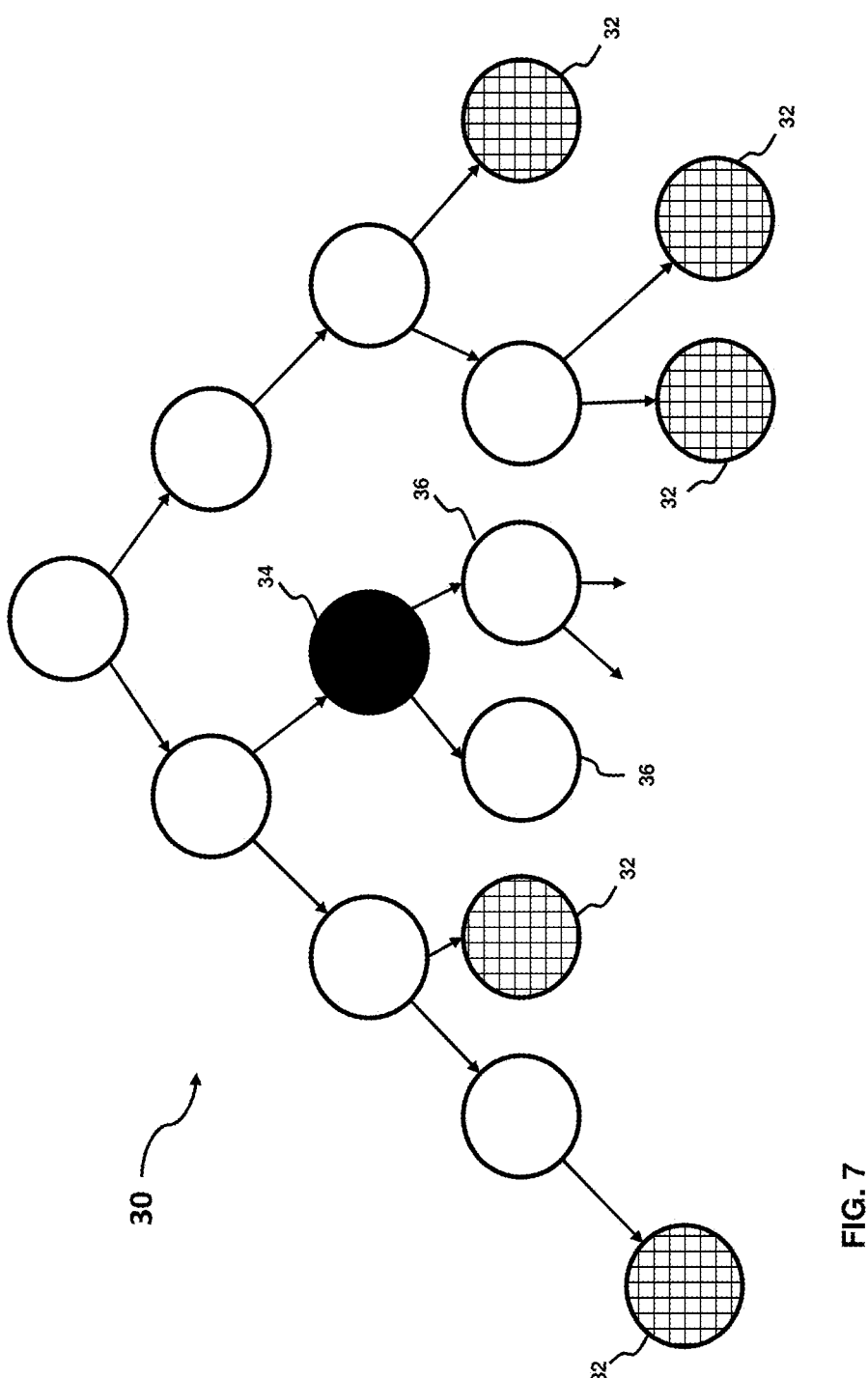

FIG. 7 shows second data field generation by using a hierarchical tree structure and a machine-learning model assisting with tree traversal.

Figure 8:
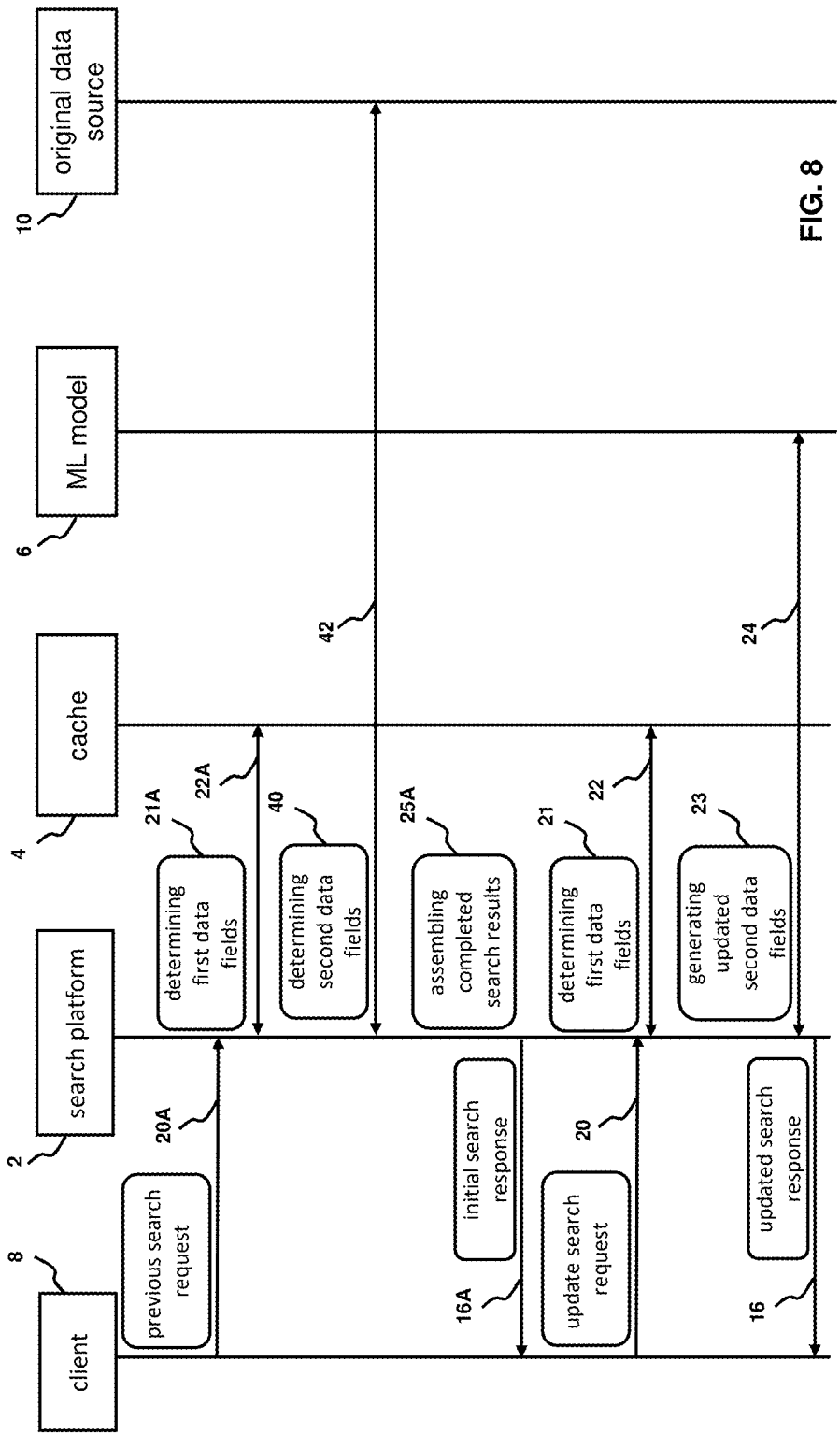

FIG. 8 visualizes a message flow for a situation that the search request is a follow-up update request.

Figure 9:
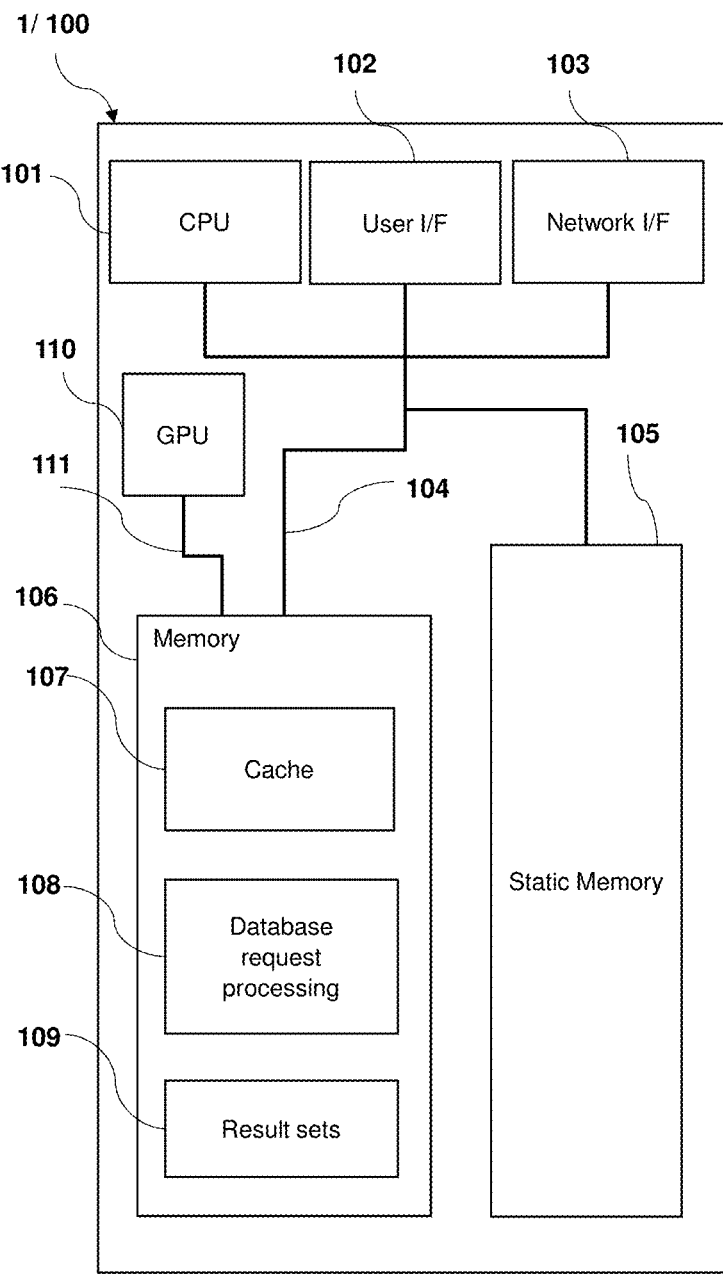

FIG. 9 is a diagrammatic representation of the internal components of a computing device as described herein.

DETAILED DESCRIPTION

The present disclosure addresses a technical problem in information technology, and more specifically in search systems which process search requests from a client. A search request sent by and received from a client includes one or more search parameters, i.e. one or more parameter-value pairs, which indicate a strict or fuzzy search space limitation. The search system is arranged to process the search request in particular by determining a number of search results which correspond to the parameter value pairs in the search request and to return the search results. In order to fulfil this functionality, the search system typically includes one or more search platforms, e.g. a computerized machine, equipped with hardware and software to process the search request, take measures to identify search results corresponding to the search parameters and returning, if at least one search result has been identified, the at least one search result to the requesting client.

Figure 1:
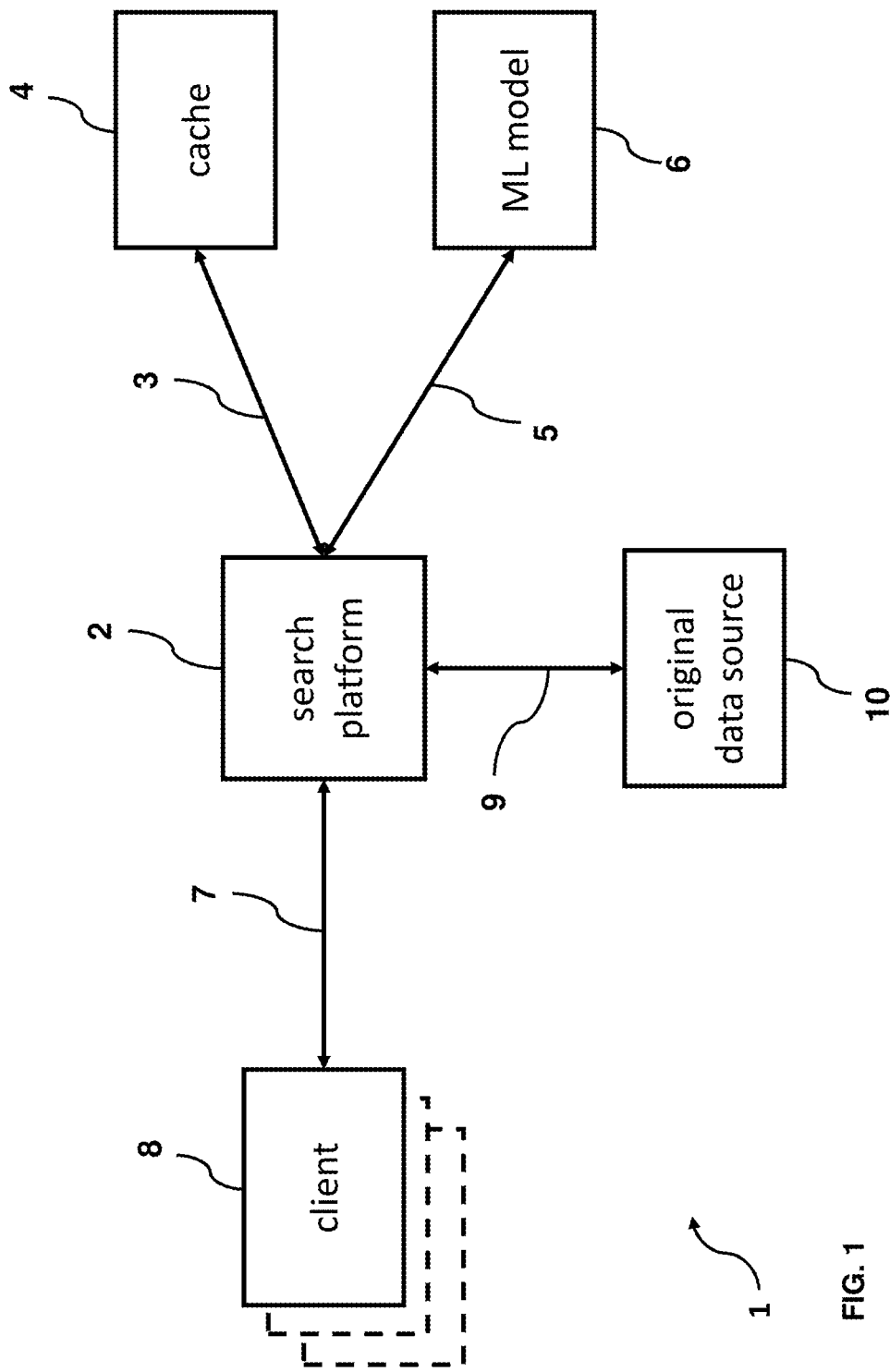
FIG. 1 illustrates a distributed search system as described herein.

A typical, simplified and schematic search system 1 is shown by FIG. 1. The search system 1 includes the search platform 2 which is communicatively coupled to one or more clients 8 over a communication interface 7. The communication interface 7 may utilize any sorts of communication technology such as wired and/or wireless communication and/or mobile communication networks, one or more local area network, and/or one or more wide area networks such as the Internet, as well as any sorts of communication protocols such as WiFi, Ethernet, Internet Protocol (IP), Transport Control Protocol (TCP), Hypertext Transfer Protocol (HTTP) and others. Search requests from the client(s) 8 and responses to the search requests are sent over the communication interface 7.

Typically, the search platform 2 may have access to data sources which may be geographically and/or operationally co-located with the search platform 2. For example, the search platform 2 may be communicatively coupled, via a further communication interface 3, to one or more caches 4 storing cached and/or pre-computed search result data. Typically, such cache 4 may provide access to pre-computed search result data in an efficient way in terms of computation resources and network load, but there may be a possibility that cached or pre-computed search result data is outdated at the time of retrieval by the search platform 2.

On the other hand, the search platform 2 may also be capable of generating search result data dynamically in response to receiving a search request. To this end, for example, the search platform 2 accesses a machine-learning (ML) model 6 via a still further communication interface 5. The ML model 6 may be hosted geographically co-located with the search platform 2, but may also be located remotely and accessible e.g. via a cloud service. Irrespective of the geographical location, the ML model 6 is considered to form an operational part of the search platform 2 as the ML model 6 is specifically trained and adapted to generate the data fields for the search responses to be returned by the search platform 2. In terms of response times and network load, generating search result data by using the ML model 6 may be more efficient compared to retrieving search result data from any further external data source such as an inventory or a similar original source providing valid search result data.

In some variations, the search system 1 may also actually comprise an original data source 10, accessible by the search platform 2 via a communication interface 9. As mentioned before, contacting the original data source 10 may involve significantly more overhead, e.g. by being more time consuming and/or involving more processing resources, to determine any content for preparing search results in response to a search request. Additionally or alternatively, also the interface 9 may face technical limits, e.g. a limited number of connections, sockets or ports being available at a given time. Thus, the search platform 2 may be forced to limit the number of requests directed to the original data source 10 in order to efficiently prepare response data to be returned to a requesting client 8.

Figure 2:
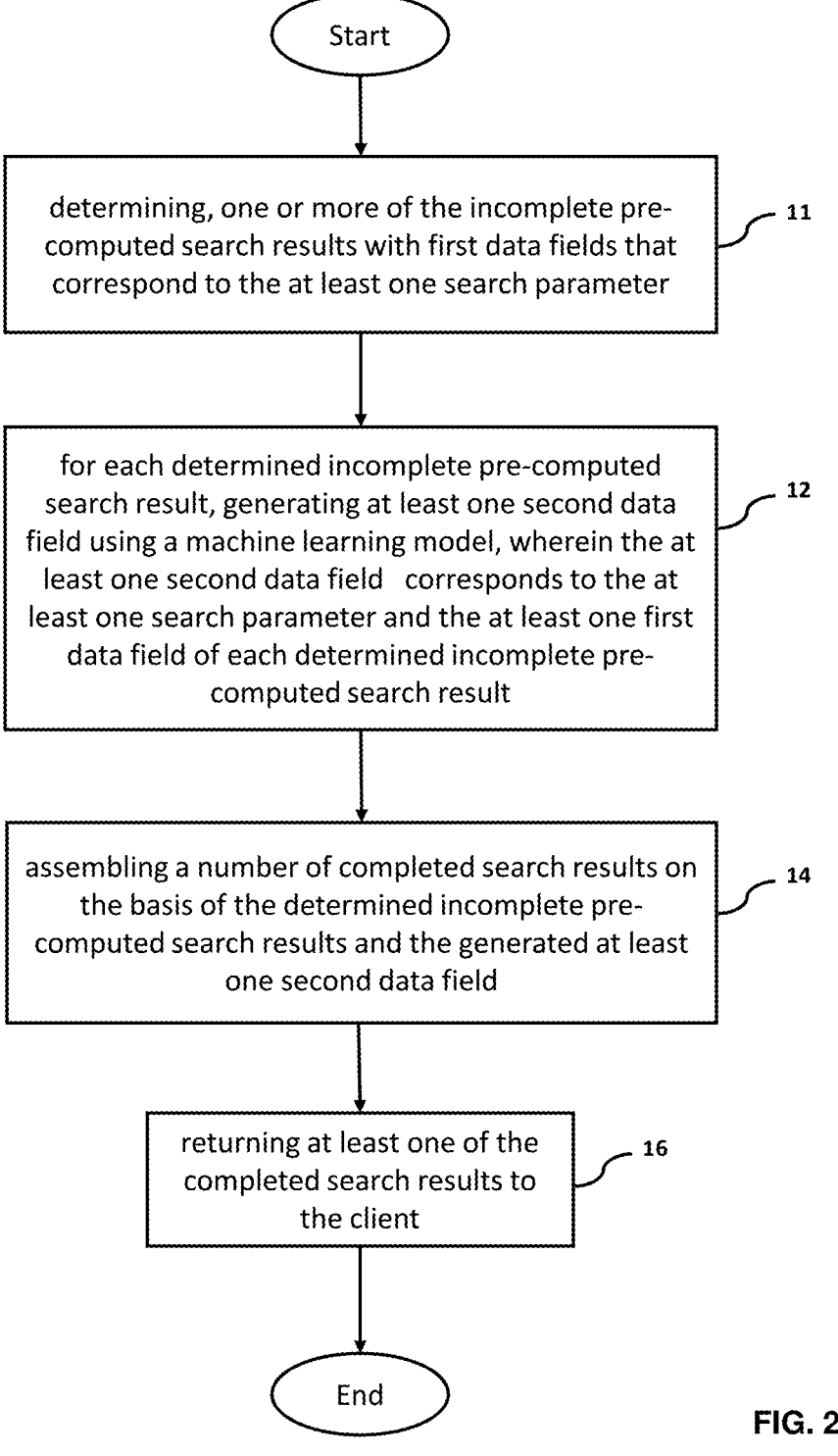
FIG. 2 is a flow chart visualizing the present methodologies at a general level of abstraction.

These data sources available to the search platform 2 are utilized according to the present disclosure as follows. According to an aspect, a method for processing search requests at a search platform is provided (FIG. 2). Generally, the search results to be returned by the search platform 2 can be split into two parts, namely first data fields and second data fields. The content of the first data fields is maintained in the cache 4, while the second data fields are generated dynamically by using the ML model 6. The content of the first data fields stored in the cache 4 can be considered to be still incomplete search results, as the second data fields to be generated by the ML model 6 are still missing. Accordingly, the search platform 2 is arranged to access the cache 4 with a number of incomplete search results, wherein each incomplete search result comprises at least one first data field.

With reference to FIG. 2, in response to receiving a search request with at least one search parameter from a client 8, the search platform 2 determines 11 one or more of the incomplete search results with first data fields that correspond to the at least one search parameter included in the search request. For each determined incomplete search result, the search platform 2 assembles 12 at least one second data field using a machine learning model, wherein the at least one second data field corresponds to the at least one search parameter and the at least one first data field of each determined incomplete search result. Furthermore, the search platform 2 assembles 14 a number of completed search results on the basis of the determined incomplete search results and the generated at least one second data field. The assembled search results can be considered to be completed as they include all data fields requested by the client 8 and/or prescribed by the search request/response protocol of the particular use case. Finally, the search platform 2 returns 16 at least one of the completed search results to the client 8.

Figure 3:
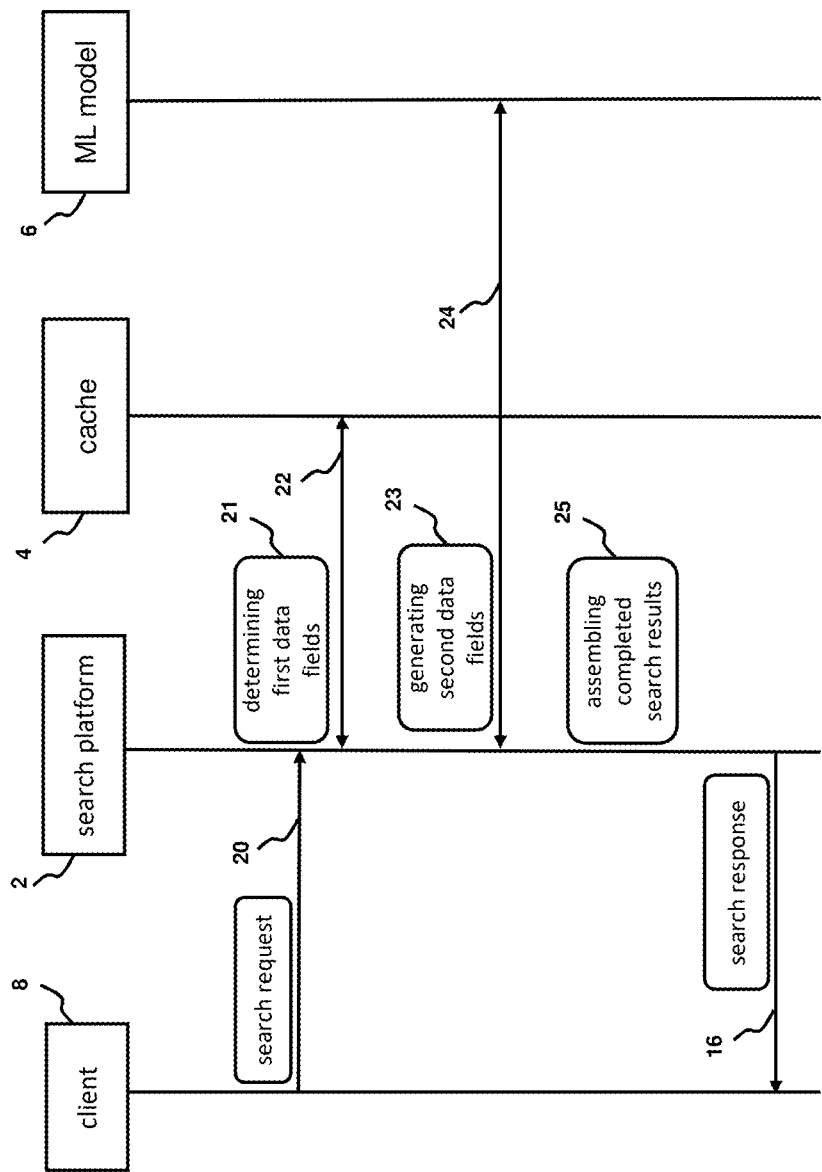
FIG. 3 is a message sequence chart visualizing the present methodologies still at a general level of abstraction.

Another representation of this procedure is given by the message sequence chart of FIG. 3. The client 8 sends 20 a search request to search platform 2. The search request indicates one or more search parameters, for example one or more ranges of values for a data field, a lower value boundary for a data field, an upper value boundary for a data field, a specific value for a data field, a specific value with some tolerances for a data field, etc. The search parameter(s) indicated in the search request may refer at least to one or more of the first data fields. Additionally, the search parameter(s) indicated in the search request may refer to one or more of the second data fields. The search platform 2 receives and processes the search request.

First, the search platform 2 determines 21 one or more first data fields by retrieving one or more incomplete search results with content corresponding to at least one search parameter indicated in the search request from the cache 4. To this end, the search platform 2 may retrieve 22 as many incomplete search results from the cache 4 as available in the cache 4 and as fulfilling the at least one search parameter. Alternatively, the search platform 2 may apply a cap limiting the number of incomplete search results retrieved from the cache 4, even if the cache 4 may include more incomplete search results beyond the cap. For example, the cache 4 may include 20 incomplete pre-computed search results corresponding to the search parameters indicated in the search request, but the search platform 2 may retrieve only 10 of the 20 incomplete search results from the cache 4.

Next, the search platform 2 may attempt to generate 23 a set of second data fields for each of the incomplete search results retrieved from the cache 4. To this end, the search platform 2 may interrogate 24 the ML model 6, e.g. inputting one or more search parameters indicated the search request relating to the second data field(s), if present, and also indicating information about the first data fields of the retrieved incomplete search results. In turn, the ML model outputs content of the second fields which is in line with the at least one search parameter, if present, and the at least one first data field of each determined incomplete search result.

After the second data fields have been generated, the search platform 2 assembles 25 one or more completed search results. To this end, for any incomplete search result, the search platform 2 may add (e.g. concatenate, integrate) the corresponding one or more second data fields generated by the ML model 6 to build the resulting complete search results, so that the complete search results include both, the first and the second data fields. The search platform may then return 16 one or more of the assembled completed search results to the client 8 by way of a search response.

Figure 5:
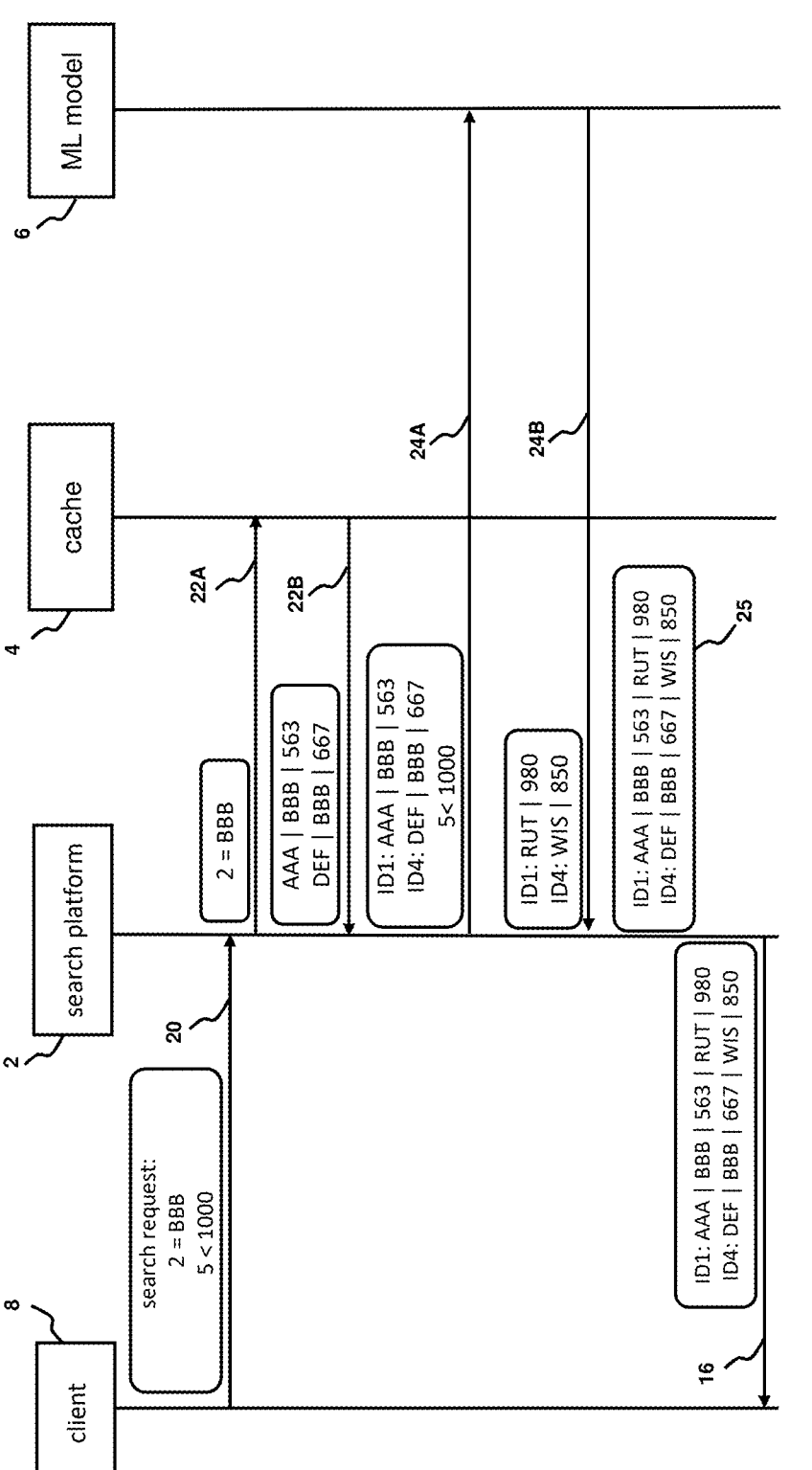
FIG. 5 represents message exchange relating to the data field example of FIG. 4.

An example (using generic content) of first and second data fields is given by FIGS. 4 to 6. FIG. 4 depicts six incomplete pre-computed search results with three data fields (Parameter 1, Parameter 2, Parameter 3) and respective values. These six incomplete pre-computed search results are stored in the cache 4. Potentially related second data fields (Parameter 4, Parameter 5) are not stored in the cache 4, but would be generated by using the ML model 6 in response to a search request asking for one or more of the six incomplete search results.

For example, the search request received from the client 8 may indicate two search parameters, the value BBB for Parameter 2, i.e. one of the first data fields, and a value of 1000 as upper limit for Parameter 5, i.e. one of the second data fields (FIG. 5). In order to determine 21 incomplete search results corresponding to the search request, the search platform requests 22A such data records stored in the cache which comprise the value BBB in Parameter 2. The cache identifies two such data records and returns 22B these two data records (AAA|BBB|563 and DEF|BBB|667, cf. FIG. 4) as incomplete search results to the search platform 2.

Next, the search platform 2 seeks to generate content for the second data fields (Parameter 4 and Parameter 5). To this end, the search platform sends a request 22A to the ML model 6, indicating the two incomplete search results as well as the second search parameter indicated in the search request, i.e. the upper limit of 1000 for Parameter 5. The ML model request 24A may also indicate identifiers (which are unique over a given period of time within the search system) in order to enable the search platform 2 to associate the response 24B from the ML model 6 with the incomplete search results. The information is input into the ML model 6 which generates two sets of second data fields (ID1: RUT|980 and ID4: WIS|850, cf. FIG. 6), a value for Parameter 4 and Parameter 5 relating to the first incomplete search results and a value for Parameter 4 and Parameter 5 relating to the second incomplete search results. The generated content is received 24B by the search platform 2 which then assembles 25 two completed search results by concatenating the first and second data fields and then returns 16 the completed search results to the client 8.

Similar procedures are performed in the event of more search parameters included in the search request. With reference to the example of FIG. 4, the search request may include search parameters for all three first data fields as well as search parameters for all two second data fields. More generally, in some embodiments according to the disclosure, the search request indicates at least two search parameters, wherein at least one first search parameter relates to at least one first data field and at least one second search parameter relates to the at least second data field, as described above with reference to FIGS. 4 to 6. In such embodiments, the method comprises determining the one or more of the incomplete search results with first data fields that correspond to the at least one first data parameter (in the example of FIGS. 4 and 5: Parameter 2 with value BBB) and, for each determined incomplete search result, generating the at least one second data field using the machine learning model, wherein the at least one second data field corresponds to the at least one second search parameter (in the example of FIGS. 4 and 5: Parameter 5 with upper limit 1000) and the at least one first data field of each determined incomplete search result.

In some embodiments according to the present disclosure, the search request includes one or more search parameters relating to the first data fields, but no search parameters relating to the second data fields. In such embodiments, the search platform 2 retrieves incomplete search results from the cache 4 on the basis of the search parameters indicated in the search request. The one or more second data fields are then generated by the ML model 6 without additional restrictions, i.e. in accordance with the determined first data fields and, thus, in accordance with the one or more search parameters relating to the first data field(s).

In some embodiments, the ML model 6 comprises at least one of deep neural network, a gradient boosting tree model, and—more specifically—a generative artificial intelligence model. The specific type and characteristics (e.g. the number of layers of a deep neural network or its architecture) and training of the ML model 6 depend on the particular use case. The skilled person is able to identify a suitable ML model type. Generally, training of the ML model can be facilitated by historic real data, e.g. with the content of the second data fields originating from original data sources 10 which, according to the present disclosure, are to be replaced by content generation using the ML model 6. In addition or alternatively, ML model training may also utilize synthetic data which has been specifically prepared for training purposes.

For example, the ML model 6 may be trained using content obtained from an original data source 10 in response to an initial search request and additional content obtained from the original data source 10 in response to a follow-up search request requesting an update of search results provided in response to the initial search request (cf. scenario discussed with reference to FIG. 8 further below). Hence, training may convey a relation between initial and updated search result content. Training may also be facilitated by normalization techniques to simplify the generation of follow-up search results as both, initial and follow-up content have reference to a normalized value range or the like. Training may be performed with normalized initial values and with normalized updated values, so that deviations between initial and updated values are comparable. Normalized output of the ML model 6 may be denormalized by using an inverse of the utilized normalization function to obtain the actual value generated by using the ML model 6.

In order to ensure performance and deterministic response times (also vis-à-vis the requesting client 8), the ML model 6 may run on special hardware and a dedicated platform. For example, the ML model 6 may be executed on a hardware-accelerated platform, besides one of more Central Processing Units (CPU) equipped with a number of specialized processors specifically arranged for the execution of AI-related operations. For example, the hardware platform of the ML model 6 may include a number of Graphics Processing Units (GPU) and/or Tensor Processing Units (TPU) which execute particular operations such as matrix multiplications to generate the output of the ML model 6.

In some embodiments, depending on the particular characteristics of the ML model 6, generating at least one second data field comprises traversing a hierarchical tree with multiple branches, utilizing the ML model 6 to predict a subset of the branches of the hierarchical tree for traversing, and skipping traversing the hierarchical tree when the predicted subset of the branches has been traversed. In some embodiments, the method further includes skipping traversing the hierarchical tree prior to completing traversing the predicted subset of the branches in response to a further side-condition being fulfilled. These measures promote deterministic response times of generating the second data fields and, thus, also deterministic response times from the perspective of the requesting client 8.

An example is shown by FIG. 7. Generating the second data fields may include traversing a tree structure in order to explore potential values and find optimal values for the second data fields. The ML model 6 may be utilized to determine optimized ways or short-cuts through the tree. For example, the ML model 6 may determine that a certain path may not lead to a promising candidate value and may decide to skip traversing such branch.

The exemplary (simplified) tree structure 30 of FIG. 7 may enable the search platform 2 to generate the second data fields without contacting an original data source 10. For example, each leaf node of the tree structure may represent a potential value for a second data field. Traversing the tree structure may lead to such values of second data fields which fit to the already determined first data fields as well as to search parameters indicated in the search request. The tree structure 30 thus represents a search space for generating the second data fields.

However, traversing the entire tree structure may require significant processing resources. The ML model 6 may be utilized to enhance traversing the tree structure 30 in an intelligent way, by recognizing paths which include non-fitting leaf nodes, i.e. values of second data fields that are likely not in line with the determined first data fields and/or search parameters indicated in the search request. Branches leading to such non-fitting leaf nodes may therefore be cut out and not traversed. Hence, the ML model 6 may effectively reduce the search space and, accordingly, decrease response times and utilization of processing resources.

In the example of FIG. 7, the ML model 6 may have been trained to determine that branches leading to leaf nodes 32 are worthwhile to traverse as these leaf nodes 32 represent second data field values which are likely to match the determined first data fields and the search parameters indicated in the search request. However, other leaf nodes 36 are determined by the ML model 6 to be likely inconsistent with the determined first data fields and/or the search parameters indicated in the search request. Thus, parent node 34 is cut from traversing the tree structure 30 and, consequently, all child nodes 36 of parent node 34 are excluded from traversal for generating the current second data fields. Thus, effectively, the ML model 6 predicts a subset of the branches of the hierarchical tree structure for traversing (namely the branches leading to the leaf nodes 32), and skips traversing the hierarchical tree when the predicted subset of the branches has been traversed (i.e. branch of node 34 is not traversed).

In a variant, the ML model 6 may prioritize the branches to be traversed and skip traversing remaining branches once a given side-condition is fulfilled. With continued reference to FIG. 7, the ML model 6 may have prioritized the tree branches leading to leaf nodes 32 and may have de-prioritized the branches leading to nodes 36. The latter ones may still be traversed, but only after traversal of branches to the leaf nodes 32 has been completed. However, in response to determining that the side-condition is fulfilled, traversal of the hierarchical tree structure 30 is aborted and, thus, traversal of the branches leading to nodes 36 is skipped. The side-condition may specify a limitation of resources to be utilized for determining the second data fields, such as a maximum amount of time to be spent for traversing the tree structure 30, a maximum amount of processing resources (e.g. instruction cycles) to be spent for traversing the tree structure 30, a maximum number of nodes or leaf nodes to be visited when traversing the tree structure 30, a maximum memory usage reached, a sufficient confidence level for estimating second data fields reached, a sufficient degree of convergence for estimating a second data field reached etc.

In some embodiments, the search platform 2 receives a previous search request from the client, which precedes the search request depicted in FIGS. 3 and 5. Thus, the search request of FIGS. 3 and 5 is a follow-up search request following an earlier, e.g. initial, search request. In such event, the search platform 2 generates, using at least an original data source 10, one or more complete previous search results including at least one first data field and at least one second data field corresponding to one or more search parameters in the previous search request. For example, the search platform 2 may determine the at least one first data field of the complete previous search results on the basis of the cache 4, but determine the at least second data field of the complete previous search results on the basis of the original data source 10. The search platform 2 then returns at least one of the generated one or more complete previous search results to the client 8.

The search request from the client 8 (FIGS. 3 and 5) then requests 20 an update of at least one of the returned complete previous one or more search results, the update requiring an update of at least one second data field. In this particular situation, the search platform 2 may generate at least one second data field using the ML model 6, and this generation constitutes the requested update of the at least one second data field.

Depending on the particular use case, it may also be possible to re-use the second data fields of the previous complete search results determined in response to the previous search request using the original data source 10 in order to render generation of the second data fields for the follow-up update search request more efficiently. For example, the previous (initial) second data fields may be input into the ML model 6 as part of an input vector. In this way, the previous second data field may serve as a reference or starting value to generate the updated second data fields.

Thus, the previous second data fields may be utilized by the ML model 6 as base values and the ML model 6 may determine the updated second data fields by inferring a difference to the previous second data fields, wherein the difference is given by the search parameters indicated in the follow-up search request constituting the requested update. For example, depending on the use case, a boundary may be set based on the previous second data field value, and the updated second data field value generated by the ML model 6 is to be located within that boundary. Any values outside the boundary may then be efficiently discarded. For example, any branches in the hierarchical tree structure 30 likely leading to leaf nodes representing values outside of the boundary may be skipped or de-prioritized.

A corresponding example is shown by FIG. 8. Activities 20A, 21A, 22A, 25A and 16A correspond to activities 20, 21, 22, 25 and 16 in FIGS. 3 and 5 with the particularity that these activities of FIG. 8 realize a previous search request such as an initial search request. Different from generating the second data fields based on the ML model 6 in FIGS. 3 and 5, the second data fields for the initial search results are here determined 40 by retrieving these from an original data source 10. In a variation of the example of FIG. 8, also the first data fields may be retrieved from the original data source 10. Compared to determining the first data fields from the cache 4, this may have synergetic effects with determining the second data fields from the original data source 10, and may therefore not be significantly more costly (in terms of response times and processing resources) than determining the first data fields using the cache 4.

At some point of time after the initial search response has been returned 16A, the search platform 2 may receive 20 the update search request, i.e. the search request of FIGS. 3 and 5. This follow-up search request may be processed as described above with respect to FIGS. 3 and 5, and as also shown by activities 20, 21, 22, 23, 24 and 16 in FIG. 8 (assembling 25 is omitted in FIG. 8 for sake of brevity). The update search request may ask for an update of in particular the second data fields. Generating 23 the second data fields may then utilize the ML model 6 as described above, but may also make use of the initial second data fields as described above. To this end, the initial second data fields returned 16A as part of the initial search response may have been stored by the search platform 2 (e.g. after assembling 25A), and the update search request may indicate an identification of the initial search results, enabling the search platform 2 to lookout and retrieve the correct initial search result with the initial second data fields.

The present methodologies can be applied in various particular use cases. For example, the first data fields may represent relatively static data which rarely changes over time, while the second data fields may represent relatively volatile data which regularly changes over time. In such scenarios, maintaining only the more static data in the cache 4 is favorable in terms of memory utilization and computational resources to keep the cache 4 up-to-date. At the same time, using the ML model 6 to generate the more volatile data may be advantageous in terms of response time and network utilization, compared to contacting an original data source 10.

Non-limiting use cases that can be envisaged for the present methodologies include online web shops offering products and services, navigation systems, network routing, and others. The particular content, data structures of the data fields and search results, request/response protocol, organization of the cache 4, and so on, depend on the particular use case, and the present methodologies are applicable to all sorts of these aspects.

For example, in a use case of a travel search platform, the cache 4 may store relatively static content such as planned flights from origins to destinations at certain days by certain airlines and with available options (e.g. free baggage) and/or offered ancillary services (e.g. vegan meal, bulk baggage), while more volatile content such as the flight prices and additional prices for ancillary services are dynamically generated by the ML model 6. Likewise, in the use case of a navigation system, routes from origins to destinations may be stored in the cache 4, while currently required travel time may be predicted by the ML model 6. In the example of a web shop, the offered products and their characteristics (color, size, price, etc.) may be stored in the cache 4, while current availability and delivery time may be generated by the ML model 6. Numerous other use cases can be envisaged as well.

Note that the present methodologies do not exclude the additional content retrieval from an original and current data source 10, irrespective of whether the search request is a follow-up search request as discussed above with reference to FIG. 8 or any initial search request. For example, third data fields may be foreseen to form a part of the completed search results, the content of the third data fields is to be obtained from an original data source 10. Such retrieval from an original data source may be performed in parallel to the execution of the ML model 6. For example, the search platform 2 may first retrieve a number of incomplete search results (first data fields) from the cache 4, and then contact the ML model 6 to generate second data fields and contact an original data source to retrieve third data fields in parallel. Once the ML model 6 and the original data source have responded with their content, the search platform 2 then assembles the completed search results comprising the first, second and third data fields and returns the completed search results in the manner described above. For example, in the non-limiting use case of a flight search platform, the first data fields stored in the cache 4 may relate to static flight data (airline, origin, destination, day, ancillary services), the second data fields to be generated by the ML model may relate to prices specifically for the ancillary services (e.g. bags, children, pets, special meal, disabled persons) and the third data fields to be populated by requesting the original data source may relate to the price of the flight itself. Other use cases are envisaged as well.

In summary, the present methodologies enable a search platform 2 to efficiently handle search request in terms of processing resources and response times involved. Efficiency is promoted by using a machine-learning model 6 which at least partially contributes in local and thus efficient response data generation to limit response data obtaining from external and original data sources 10.

Note that the present methodologies as described above, if applied by a search platform 2, do not necessarily have to applied for all search requests received by the search platform 2. For example, the search platform 2 may apply the methodologies for some types of search requests, but may not apply the methodologies for other types of search requests which are then handled in a traditional manner. Or the search platform 2 may apply the methodologies for search requests from some clients 8, but not for search requests from other clients. Or the search platform may apply the methodologies during some periods of time, but not during other periods of time, etc.

As mentioned above, the present methodologies may be provided by a computer-implemented method, by an apparatus such as a controller as well as by computer program instructions which, when executed by at least one processor, realizes the operations described above.

FIG. 9 is a diagrammatic representation of the internal components of a computing machine 100 implementing the functionality of the search platform 1. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A display, an alpha-numeric input device and a cursor control device may be provided as examples of user interface 102. The network interface device 103 connects the computing machine 100 implementing the search platform with a client 8 as well as the cache 4, the ML model 6 and the original data source 10.

Computing machine 100 includes a memory 106 such as main memory, random access memory (RAM) and/or any further volatile memory. The memory 106 may store temporary data and program data 107 to facilitate the functionality of the search platform 2, including program data to realize receiving 20 the search request, determining 11 the first data fields, generating 12 the second data fields, assembling 14 the search results and returning 16 the search response. In addition, the memory 106 may store temporary data and program data 107 to realize the other optional functionalities of the search platform 2 described herein.

A set of computer-executable instructions embodying any one, or all, of the methodologies described herein, resides completely, or at least partially, in or on a machine-readable storage medium, e.g., in the static memory 105 or, when loaded and being executed, in the main memory 106. For example, the instructions may include software processes implementing the search request processing functionality of the search platform 2. The instructions may further be transmitted or received as a propagated signal via the Internet through the network inter-face device 103 or via the user interface 102. Communication within computing machine 100 is performed via a bus 104. Basic operation of the computing machine 100 is controlled by an operating system which is also located in the memory 106, the at least one processor 101 and/or the static memory 105.

As mentioned above, the computing machine 100 may also be equipped with a graphical processing unit (GPU) 110 or multiple GPUs in order to specifically implement neural-network-related operations such as matrix multiplications to generate the output of the ML model 6. The GPU 100 may be arranged to directly access the memory 106 via a GPU bus 111.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

In certain alternative embodiments, the functions and/or acts specified in the flowcharts, sequence diagrams, and/or block diagrams may be re-ordered, processed serially, and/or processed concurrently. Moreover, any of the flowcharts, sequence diagrams, and/or block diagrams may include more or fewer blocks than those illustrated consistent with embodiments and examples.

The terminology used herein is for the purpose of describing particular embodiments and examples, and is not intended to be limiting. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details.

The invention claimed is:

1. A method for processing search requests at a search platform, the search platform being arranged to access a cache with a number of incomplete search results, wherein each incomplete search result comprises at least one first data field, the method comprising:

in response to receiving a search request with at least one search parameter from a client, determining, using the cache, one or more of the incomplete search results with first data fields that correspond to the at least one search parameter;

for each determined incomplete search result, generating at least one second data field using a machine learning model, wherein the at least one second data field corresponds to the at least one search parameter and the at least one first data field of each determined incomplete search result, wherein generating the at least one second data field comprises:

traversing a hierarchical tree with multiple branches;

utilizing the machine learning model to predict a subset of the branches of the hierarchical tree for traversing;

skipping traversing the hierarchical tree when the predicted subset of the branches has been traversed;

assembling a number of completed search results on the basis of the determined incomplete search results and the generated at least one second data field; and returning at least one of the completed search results to the client.

2. The method of claim 1, wherein the search request indicates at least two search parameters, wherein at least one first search parameter relates to at least one first data field and at least one second search parameter relates to the at least one second data field, wherein the method comprises:

determining the one or more of the incomplete search results with first data fields that correspond to the at least one first search parameter;

for each determined incomplete search result, generating the at least one second data field using the machine learning model, wherein the at least one second data field corresponds to the at least one second search parameter and the at least one first data field of each determined incomplete search result.

3. The method of claim 1, wherein the machine learning model comprises at least one of deep neural network, a gradient boosting tree model, and a generative artificial intelligence model.

4. The method of claim 1, comprising skipping traversing the hierarchical tree prior to completing traversing the predicted subset of the branches in response to a further side-condition being fulfilled.

5. The method of claim 1, further comprising:

receiving, from the client, a previous search request preceding the search request;

generating, using at least an original data source, one or more complete previous search results including at least one first data field and at least one second data field corresponding to one or more search parameters in the previous search request;

returning at least one of the generated one or more complete previous search results to the client;

wherein the search request from the client requests an update of at least one of the returned one or more complete previous search results, the update requiring an update of at least one second data field and wherein generating at least one second data field using the machine learning model constitutes the update of the at least one second data field.

6. A search platform configured to perform the method of claim 1.

7. A non-transitory computer readable medium storing computer program instructions which, when executed at a computer, implements the method of claim 1.

8. The method of claim 4, wherein the search request indicates at least two search parameters, wherein at least one first search parameter relates to at least one first data field and at least one second search parameter relates to the at least one second data field, wherein the method comprises:

determining the one or more of the incomplete search results with first data fields that correspond to the at least one first search parameter;

for each determined incomplete search result, generating the at least one second data field using the machine learning model, wherein the at least one second data field corresponds to the at least one second search parameter and the at least one first data field of each determined incomplete search result.

9. The method of claim 4, wherein the machine learning model comprises at least one of deep neural network, a gradient boosting tree model, and a generative artificial intelligence model.

10. The method of claim 4, further comprising receiving, from the client, a previous search request preceding the search request;

generating, using at least an original data source, one or more complete previous search results including at least one first data field and at least one second data field corresponding to one or more search parameters in the previous search request;

returning at least one of the generated one or more complete previous search results to the client;

wherein the search request from the client requests an update of at least one of the returned one or more complete previous search results, the update requiring an update of at least one second data field and wherein generating at least one second data field using the machine learning model constitutes the update of the at least one second data field.

11. A search platform configured to perform the method of claim 4.

12. A non-transitory computer readable medium storing computer program instructions which, when executed at a computer, implements the method of claim 4.

* * * * *